(12) United States Patent
Gaiduk et al.

(10) Patent No.: US 11,940,609 B2
(45) Date of Patent: Mar. 26, 2024

(54) IMAGE CONVERSION MODULE WITH A MICROELECTROMECHANICAL OPTICAL SYSTEM AND METHOD FOR APPLYING THE SAME

(71) Applicants: Carl Zeiss Microscopy GmbH, Jena (DE); SD Optics, Inc., Seocho-gu (KR); Stereo Display, Inc., Anaheim, CA (US)

(72) Inventors: Alexander Gaiduk, Jena (DE); Jin Young Sohn, Fullerton, CA (US); Gyoungil Cho, Fullerton, CA (US); Cheong Soo Seo, Brea, CA (US)

(73) Assignees: CARL ZEISS MICROSCOPY GMBH, Jena (DE); SD OPTICS, INC., Seoul (KR); STEREO DISPLAY, INC, Anaheim, CA (US)

( * ) Notice: Subject to any disclaimer, the term of this patent is extended or adjusted under 35 U.S.C. 154(b) by 419 days.

(21) Appl. No.: 17/084,812

(22) Filed: Oct. 30, 2020

(65) Prior Publication Data
US 2021/0132356 A1 May 6, 2021

(30) Foreign Application Priority Data
Oct. 30, 2019 (EP) .................................. 19206199

(51) Int. Cl.
*G02B 21/12* (2006.01)
*G02B 21/00* (2006.01)
*G02B 26/08* (2006.01)

(52) U.S. Cl.
CPC ....... *G02B 21/125* (2013.01); *G02B 21/0032* (2013.01); *G02B 26/0833* (2013.01)

(58) Field of Classification Search
CPC .. G02B 21/125; G02B 21/18; G02B 27/0075; G02B 21/0032; G02B 26/0833;
(Continued)

(56) References Cited

U.S. PATENT DOCUMENTS 3,926,500 A * 12/1975 Frosch ................. G02B 21/082
359/558
7,269,344 B2 9/2007 Nishioka
(Continued)

FOREIGN PATENT DOCUMENTS

DE 19733193 A1 2/1999
DE 102017100904 A1 * 7/2018 ................ G01J 3/26
(Continued)

OTHER PUBLICATIONS

Hamilton et al. Confocal interference Microscope, Optica Acta (Year: 1982).*
(Continued)

*Primary Examiner* — Tuyen Tra
(74) *Attorney, Agent, or Firm* — Stuart H. Mayer; Kaplan Breyer Schwarz LLP

(57) ABSTRACT

The present invention concerns an image conversion module (09) that comprises an optical interface (10) for establishing an optical path (07). The image conversion module (09) further comprises a beam splitting element (13) on the optical path (07). The beam splitting element (13) is configured for splitting a beam entering the optical interface (10, 11) on the optical path (07) into a first optical subpath (14) and a second optical subpath (16). The image conversion module (09) further comprises a microelectromechanical optical system (17) that is configured for enhancing a depth of field on the first optical subpath (14) that is directed to a first optoelectronic submodule (21). The image conversion module (09) further comprises a second optoelectronic submodule (24) having an electronic sensor (26) on the second optical subpath (16). The second optoelectronic submodule (24) is configured for acquiring additional data on the sample (02).

9 Claims, 1 Drawing Sheet

(58) Field of Classification Search
CPC .... G02B 7/365; G02B 21/361; G02B 26/101; G02B 27/14; G02B 21/082; G02B 21/086; G02B 21/16; G02B 21/367; G02B 27/1066; G02B 23/04

See application file for complete search history.

(56) References Cited

U.S. PATENT DOCUMENTS

| | | | |
|---|---|---|---|
| 7,345,816 B2* | 3/2008 | Ri | G02B 21/0072 359/223.1 |
| 11,512,946 B2* | 11/2022 | Zhang | G01B 11/254 |
| 11,540,720 B2* | 1/2023 | Brzozowski | A61B 5/0077 |
| 2002/0154398 A1 | 10/2002 | Wolleschensky | |
| 2013/0162804 A1* | 6/2013 | Morrin | G02B 21/34 348/79 |
| 2013/0342673 A1* | 12/2013 | Sticker | G02B 21/245 348/79 |
| 2015/0054937 A1* | 2/2015 | Lippert | G02B 21/0064 359/372 |
| 2021/0149173 A1* | 5/2021 | Knoblich | G02B 21/02 |
| 2022/0284574 A1* | 9/2022 | Wagner | C12M 23/44 |
| 2022/0311947 A1* | 9/2022 | Terry | H04N 13/128 |

FOREIGN PATENT DOCUMENTS

| | | |
|---|---|---|
| EP | 3486706 A1 | 5/2019 |
| WO | 2005/119331 | 12/2005 |
| WO | 2007134264 | 11/2007 |

OTHER PUBLICATIONS

Bednarkiewicz et al. Digital micromirror device, Applied Optics (Year: 2008).*

Neu et al., Time resolved confocal microscopy, Proc. of SPIE (Year: 2010).*

Maciel et al., Optical coherence tomography, Journal of Physics D: Applied Physics (Year: 2018).*

Vohnsen et al., Hartmann-Shack wavefront sensing without a lenslet array using a digital micromirror device, Applied Optics (Year: 2018).*

Thorlabs website < https://www.thorlabs.com/navigation.cfm?guide_id=2395 > (Year: 2015).*

Thorlabs website < https://www.thorlabs.com/navigation.cfm?guide_id=2365 > (Year: 2016).*

Chen, X. et al. "Diffraction of digital micromirror device gratings and its effect on properties of tunable fiber lasers" in Applied Optics, 51 (30), pp. 7214-7220, 2012.

* cited by examiner

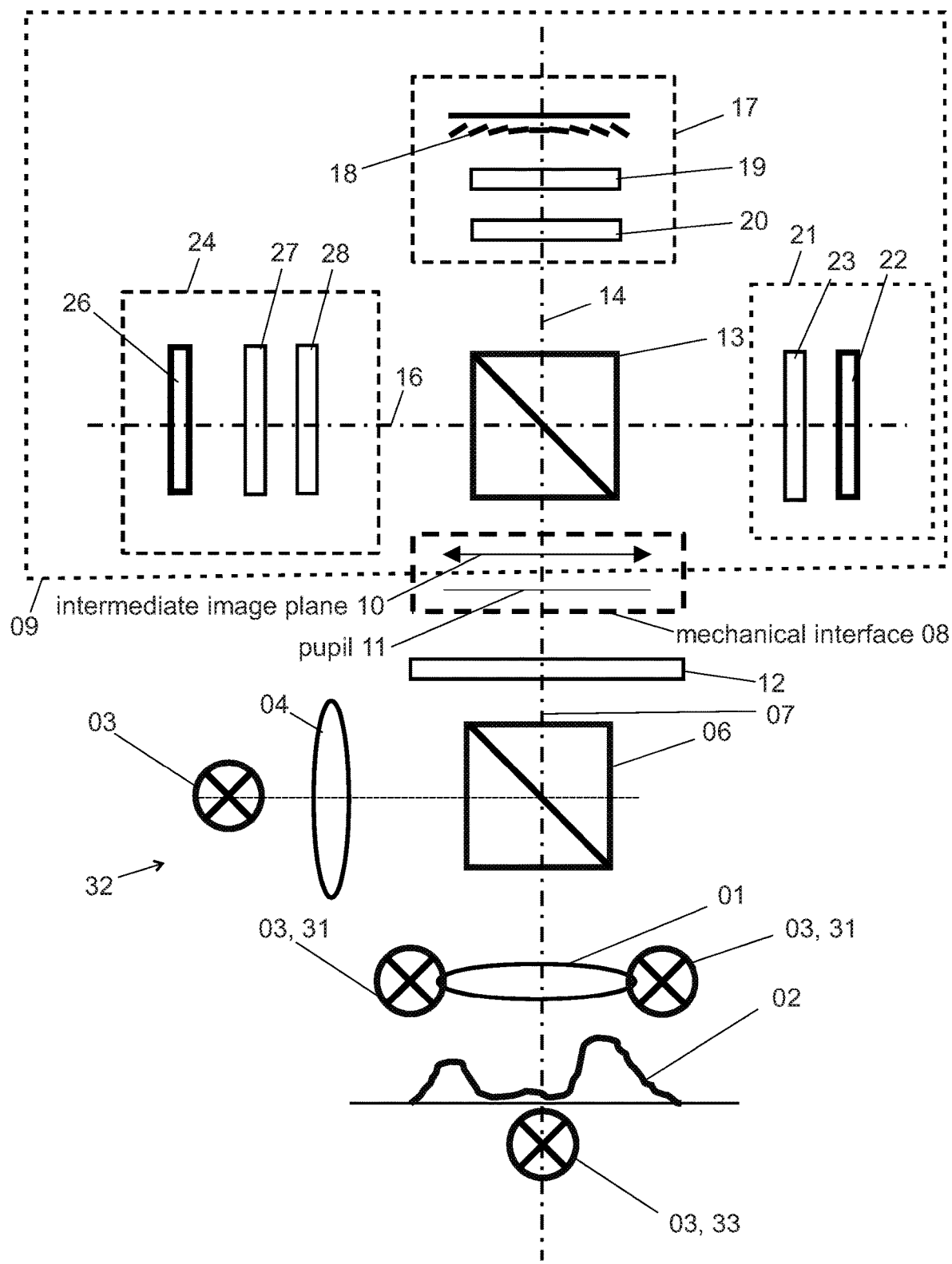

IMAGE CONVERSION MODULE WITH A MICROELECTROMECHANICAL OPTICAL SYSTEM AND METHOD FOR APPLYING THE SAME

BACKGROUND OF THE INVENTION

The present invention concerns an image conversion module that comprises a microelectromechanical optical system for enhancing a depth of field. For instance, the image conversion module can be used as a part of a microscope or another optical instrument. Furthermore, the present invention concerns a method for applying said image conversion module.

DE 197 33 193 A1 teaches a microscope with an adaptive optics. A transmitting wave front modulator is located between an objective and a tube lens. The microscope can be used for confocal microscopy, for laser-supported microscopy, for conventional microscopy, or for analytic microscopy.

U.S. Pat. No. 7,345,816 B2 shows an optical microscope that includes a light source which irradiates a sample with illuminating light. A mirror, which has a variable reflection surface, reflects the illuminating light. A correction table stores plural data of plural shapes of the reflection surface which correspond to changes in a focal position and an aberration.

U.S. Pat. No. 7,269,344 B2 teaches an optical apparatus that has an imaging optical system provided with a deformable mirror and an electronic zoom function. A ray deflecting function of the deformable mirror is changed in accordance with a change of an object area corresponding to an image to be used. This solution aims at a high sharpness of a taken image even when a variable magnification ratio is increased.

WO 2005/119331 A1 teaches a variable focal length lens comprising a plurality of micromirrors with two degrees of freedom of rotation and one degree of freedom of translation. The two degrees of freedom of rotation and one degree of freedom of translation of the micromirrors are controlled to change the focal length of the lens and to satisfy the same phase conditions for the lights. The lens is diffractive Fresnel lens.

WO 2007/134264 A2 shows a three-dimensional imaging system with a variable focal length micromirror array lens. The micro mirror array lens comprises a plurality of micromirrors, wherein each of the micromirrors is controlled to change the focal length of the micromirror array lens. The imaging system further comprises an imaging unit and an image processing unit which produces three-dimensional image data using the images captured by the imaging unit and the focal length information of the micromirror array lens.

EP 3 486 706 A1 teaches a functional module for a microscope. That functional module comprises a mechanical interface for removable mounting the functional module to a module support of the microscope. The functional module further comprises an optical interface for establishing an optical path from an objective of the microscope to the functional module. Furthermore, the functional module comprises at least one image sensor. The functional module comprises a first microelectromechanical optical system and a second microelectromechanical optical system. The first microelectromechanical optical system is configured for enhancing a depth of field on a first optical subpath that is directed to the image sensor. The second microelectromechanical optical system is configured for enhancing a depth of field on a second optical subpath that is directed to the image sensor. The benefit of using the two microelectromechanical optical systems is to improve the light efficiency.

SUMMARY OF THE INVENTION

An object of the present invention is to provide images of a sample with an enhanced depth of field and additional data as for instance additional spectral data on the sample, additional field of view with a different size and resolution, or depth of field with a different size and resolution, polarization data on the sample, data on a geometric property of the sample, or data on a feature of the sample.

The aforementioned object is achieved by an image conversion module according to the enclosed claim 1 and by a method according to the enclosed claim 9.

The image conversion module according to the invention is intended to be used as a part of an optical instrument. The optical instrument is an imaging device and it is preferably a microscope or a telescope. The optical instrument comprises an objective for gathering light from an object or a sample to be examined.

The image conversion module comprises an optical interface for establishing an optical path of the image conversion module. The optical interface is preferably an entry of the image conversion module. The optical interface is preferably located at an intermediate image plane.

The image conversion module further comprises a beam splitting element on the optical path. That beam splitting element is configured for splitting a beam entering the optical interface on the optical path into a first optical subpath and a second optical subpath.

The image conversion module further comprises a first optoelectronic submodule with an image sensor for converting an image gathered by the optical instrument and transferred to the image sensor into an electrical signal. Hence the first optical subpath is established from the beam splitting element to the image sensor. The image sensor is preferably a semiconductor image sensor array, e. g., a CMOS.

The image conversion module further comprises a microelectromechanical optical system that is configured for enhancing a depth of field on the first optical subpath that is directed to the image sensor. Hence, the image sensor can acquire a number of individual images with limited depth of view very fast and these images can be combined electronically into an image with an enhanced a depth of field representing the sample.

The image conversion module further comprises a second optoelectronic submodule that comprises an electronic sensor on the second optical subpath. That second optoelectronic submodule is configured for acquiring additional data and/or information on the sample. The additional data like spectral data or contrast data acquired using the second optoelectronic submodule can supplement and/or support the at least one image with the enhanced depth of field acquired using the first optoelectronic submodule.

The second optoelectronic submodule is an additional submodule of the image conversion module. The image conversion module can also be used without the second optoelectronic submodule. Especially, images with an enhanced depth of field can be recorded using the image conversion module without the second optoelectronic submodule. The first optoelectronic submodule is exchangeable. Also, components within the first optoelectronic submodule are preferably exchangeable. The second optoelectronic submodule is exchangeable. Also, components within the second optoelectronic submodule are preferably exchangeable.

A special benefit of the image conversion module according to the invention is that images with an enhanced depth of field (EDoF) and additional data on the sample or on the object to be imaged can be recorded simultaneously. The image conversion module can be placed on a microscope or another imaging device and it is capable of enhancing the imaging properties of the microscope or imaging device. In particular, a depth of field of the microscope or imaging device can be enhanced. A field of view of the microscope or imaging device can be enhanced. Several depths of field and/or fields of view can be available for the microscope or imaging device at the same time. Multiple imaging parameters and/or imaging modalities can be detected at the same time in pre-defined depths of field and fields of view. The image conversion module provides options for simultaneous data acquisition with different modes and/or specifications, such as magnification, spectral range, resolution, detection contrast, acquisition speed, time resolution, field of view, polarization.

BRIEF DESCRIPTION OF THE DRAWINGS

FIG. 1 shows a schematic representation of a microscope.

DETAILED DESCRIPTION OF THE INVENTION

In preferred embodiments of the image conversion module according to the invention, the electronic sensor of the second optoelectronic submodule is an additional image sensor. Hence, the image conversion module comprises at least two image sensors, namely, the regular image sensor of the first optoelectronic submodule and the additional image sensor of the second optoelectronic submodule. Preferably, these two image sensors show different characteristics, especially, in contrast, colour, and/or range of field. Alternatively, just one of these two image sensors can be used, but it will have a fixed focal position, fixed depth of field, fixed field of view, fixed resolution, etc. It can be appropriately selected for a specific purpose. For example, for two image sensors with the same number of pixels, one with larger pixels would have a larger field of view, but smaller XYZ resolution.

In preferred embodiments of the image conversion module, the electronic sensor of the second optoelectronic submodule is configured for measuring geometric properties of the sample, or the electronic sensor is configured for detecting a feature of the sample, or the electronic sensor is configured for detecting height features of the sample. For this purpose, the electronic sensor of the second optoelectronic submodule is preferably a laser ranger.

In preferred embodiments of the image conversion module, the electronic sensor of the second optoelectronic submodule is configured for acquiring contrast data on the sample, spectral data on the sample, polarization data on the sample, data on a geometric property of the sample, and/or data on a feature of the sample.

In preferred embodiments of the image conversion module according to the invention, the additional image sensor of the second optoelectronic submodule is a polarization image sensor, a hyperspectral image sensor, a thermal image sensor, or an optical sensor system adjusted for fluorescence detection. Such image sensors provide additional data on the sample supporting the image with the enhanced depth of field.

The microelectromechanical optical system is preferably a mirror array lens system. Such mirror array lens systems are offered under the trademark MALS.

In preferred embodiments of the image conversion module according to the invention, the microelectromechanical optical system comprises an array of moveable micromirrors. Each of the movable micromirrors shows two degrees of freedom of rotation and one degree of freedom of translation. The degree of freedom of translation of the moveable micromirrors of the microelectromechanical optical system is preferably along to the first optical subpath. The two degrees of freedom of rotation of the moveable micromirrors of the microelectromechanical optical system are preferably perpendicular to the first optical subpath.

In preferred embodiments of the image conversion module according to the invention, the optical interface, the first optoelectronic submodule, the second optoelectronic submodule and the microelectromechanical optical system are directed towards the beam splitting element. The beam splitting element is preferably a beam splitter, a colour beam splitter or a polarizing beam splitter. The beam splitter, the colour beam splitter, and the polarizing beam splitter, respectively, splits the optical path into the first optical subpath that is directed to the microelectromechanical optical system and into the second optical subpath that is directed to the second optoelectronic submodule. Furthermore, the microelectromechanical optical system is preferably optically directed to the first optoelectronic submodule via the beam splitting element.

Preferably, the first optical subpath and the second optical subpath cross each other within the beam splitting element.

Preferably, the beam splitting element is located between the optical interface and the microelectromechanical optical system. Preferably, the beam splitting element is located between the first optoelectronic submodule and the second optoelectronic submodule.

Preferably, the microelectromechanical optical system, the beam splitting element and the optical interface are arranged on a first straight line. Preferably, the first optoelectronic submodule and the beam splitting element and the second optoelectronic submodule are arranged on a second straight line.

Preferably, the beam splitter is a polarizing beam splitter. The polarizing beam splitter polarizes light of the optical path.

In preferred embodiments of the image conversion module according to the invention, a waveplate is located on the first optical subpath and/or on the second optical subpath. The one waveplate or each of the waveplates is preferably a $\lambda/4$ waveplate. Preferably, the waveplate is located on the first optical subpath between the microelectromechanical optical system and the beam splitting element.

In preferred embodiments of the image conversion module according to the invention, the beam splitter is a polarizing beam splitter, and the microscope further comprises a first $\lambda/4$ waveplate that is located on the first optical subpath between the microelectromechanical optical system and the beam splitter.

In preferred embodiments of the image conversion module according to the invention, a lens, a colour filter, an active acousto-optical modulator, an active electro-optical modulator, and/or a passive or active interferometric element is located on the first optical subpath, on the second optical subpath and/or on the optical path. These further components can provide specific functionality.

The lens, the colour filter, the active acousto-optical modulator, the active electro-optical modulator, and/or the passive or active interferometric element is preferably located between the second optoelectronic submodule and the beam splitting element and/or between the beam splitting element and the first optoelectronic submodule. The lens, the colour filter, the active acousto-optical modulator, the active electro-optical modulator, and/or the passive or active interferometric element is preferably located at the second optical subpath between the second optoelectronic submodule and the beam splitting element. The lens between the second optoelectronic submodule and the beam splitting element combined with the lens between the beam splitting element and the first optoelectronic submodule may lead to various magnification for the first optical subpath and for the second optical subpath and to sequential detection by the image sensor.

The image conversion module preferably comprises a mechanical interface for removable mounting the image conversion module to a module support of the optical instrument. Hence, the image conversion module is exchangeable.

Preferred embodiments of the image conversion module according to the invention further comprise a control unit for controlling the microelectromechanical optical system, the first optoelectronic submodule and the second optoelectronic submodule.

Preferably, the control unit is further configured for acquiring additional contrast data on the sample using the second optoelectronic submodule. That additional contrast data are preferably polarization data, differential interference data, phase contrast data, thermal imaging data, spectral imaging data and/or hyperspectral imaging data as well as contrast data acquired according to bright-field microscopy and/or dark-field microscopy. The control unit is preferably configured for combining that additional contrast data with the at least one image of the enhanced depth of field acquired with the image sensor resulting in a common image.

Preferably, the control unit is further configured for combining the additional contrast data with an image of the enhanced depth of field representing different spatial scales in one or more spatial directions. For example, one of the microscopic images is an overview image of a large area or volume with reduced resolution and a further of the microscopic images represents a smaller area or volume within the large one, but with higher resolution.

Preferably, the control unit is further configured for using the additional contrast data for automatic focusing that can be performed fast. Preferably, the control unit is further configured for using the additional contrast data for improving the quality of the images representing the sample. Preferably, the control unit is further configured for using the additional contrast data for a calibration of the microscope.

Preferably, the control unit is further configured for controlling the microelectromechanical optical system in order to form an optical grating.

Preferably, the control unit is further configured for taking a plurality of images with different values of focus resulting in a stack of images. The different values of focus are obtained by controlling the microelectromechanical optical system, especially, by moving the movable micromirrors of the microelectromechanical optical system, more especially; by moving the movable micromirrors of the microelectromechanical optical system to form Fresnel lenses or gratings each with varying values of the focal length.

Preferably, the control unit is further configured for processing the stack of images to an image with an enhanced depth of field.

Preferably, the control unit is further configured for processing the stack of images or the image with the enhanced depth of field to achieve a three-dimensional image.

Preferably, the control unit is further configured for processing a plurality of the stacks of images or a plurality of the images with an enhanced depth of field to achieve at least one three-dimensional image.

Preferably, the control unit is further configured for splitting images of the first optical subpath and images of the second optical subpath. That splitting is preferably obtained based on polarization, on spectral range, on phase of light or on focal position.

Preferably, the control unit is further configured for different magnifications of the first optical subpath and of the second optical subpath. Preferably, the control unit is further configured for variable magnifications of the first optical subpath and of the second optical subpath.

Preferably, the image conversion module comprises a multi-colour beam splitter unit that is preferably formed by a beam splitter for three colours, by a set of dual colour beam splitters or by dielectric mirrors arranged one after another. That multi-colour beam splitter unit provides multiple channels with individual spectral regions. These are more than two channels. That embodiment of the image conversion module preferably comprises more than one of the image sensors as described above. The number of the channels and of the optical subpaths is preferably further scaled with a growing number of the image sensors. Alternatively, the image conversion module comprises an acousto-optical actuator or an interferometer that splits different colours.

The method according to the invention aims at examining a sample or an object. For this, an optical instrument with the image conversion module according to the invention or with a preferred embodiment of the image conversion module according to the invention is used. The method according to the invention preferably aims at microscopically examining a sample. In a step of the method, the sample or object is imaged using the optical instrument, the first optoelectronic submodule, and the microelectromechanical optical system of the image conversion module. The resulting image shows an enhanced depth of field by the help of the microelectromechanical optical system. In a further step, additional data on the sample are recorded using the second optoelectronic submodule. The image with the enhanced depth of field and the additional data are displayed. Since the image and the additional data are related to the same sample the displayed data supports the displayed image. The image is preferably a microscopic image.

In preferred embodiments of the method, the additional data are an additional image of the sample or object, contrast data on the sample or object, spectral data on the sample or object, polarization data on the sample or object, data on at least one geometric property of the sample or object, and/or data on a feature of the sample or object. The spectral data can be additional to the spectral data of the image with the enhanced depth of field. The polarization data can be a polarization image.

The additional image of the sample or object preferably shows a differing resolution in at least one of three dimensions than the image with the enhanced depth of field. Additionally or alternatively, the additional image represents another part of the sample than the image with the enhanced depth of field.

The additional contrast data are preferably polarization data, differential interference data, phase contrast data, thermal imaging data, spectral imaging data, and/or hyperspectral imaging data.

The additional contrast data are preferably combined with basic contrast data acquired according to bright-field microscopy and/or dark-field microscopy. The basic contrast data are preferably acquired using the image sensor.

Preferred embodiments of the method comprise a further step. In that step, the additional contrast data are combined with the image of the enhanced depth of field resulting in a common image to be displayed. That at least one common image is displayed.

In preferred embodiments of the method, the additional contrast data are used for automatic focusing of the optical instrument on the sample or object. In preferred embodiments of the method, the additional contrast data are used for automatic coarse focusing of the optical instrument on the sample or object. That automatic focusing and that automatic coarse focusing, respectively, can be performed in a larger range compared to limited depth of field or enhanced depth of field available for the first optoelectronic submodule.

In preferred embodiments of the method, the additional contrast data are used for improving the quality of the images representing the sample.

In preferred embodiments of the method, the additional contrast data are used for a calibration of the optical instrument.

Additional advantages, details and refinements of the invention will become apparent from the following description of preferred embodiments of the invention, making reference to the drawing.

The only FIGURE shows a schematic representation of a microscope with a preferred embodiment of an image conversion module according to the invention. That microscope comprises an objective 01 for gathering light from a sample 02 to be microscopically examined. The microscope further comprises an illumination 03. The illumination 03 may be of any of different types, e. g. a dark-field illumination 31, a bright-field illumination 32 including a lens 04 and a beam splitter 06 for feeding light of the illumination 03 into an optical path 07 of the microscope, or a transmitted light illumination 33.

A mechanical interface 08 serves for mounting an image conversion module 09. An intermediate image plane 10 and a pupil 11 form an optical interface that can be located within the mechanical interface 08 and extends the optical path 07.

An optical element 12 like a filter can be located between the objective 01 and the pupil 11.

The image conversion module 09 comprises a beam splitter 13 that divides the optical path 07 into a first optical subpath 14 and a second optical subpath 16.

A microelectromechanical optical system 17 of the image conversion module 09 is located on the first optical subpath 14. The microelectromechanical optical system 17 comprises an array of moveable micromirrors 18. Each of the movable micromirrors 18 shows two degrees of freedom of rotation and one degree of freedom of translation. The microelectromechanical optical system 17 can further comprise optical elements 19, 20 like filters or a λ/4 waveplate.

The image conversion module 09 further comprises a first optoelectronic submodule 21 with an image sensor 22. Light that is reflected by the micromirrors 18 of the microelectromechanical optical system 17 is directed via the beam splitter 13 to the image sensor 22. An optical element 23 like a filter or a λ/4 waveplate can be located in front of the image sensor 22.

According to the invention, the image conversion module 09 further comprises an additional second optoelectronic submodule 24 that is located on the second optical subpath 16. The second optoelectronic submodule 24 comprises an electronic sensor 26 that can be, e. g., a polarization image sensor or a hyperspectral image sensor. The second optoelectronic submodule 24 can further comprise optical elements 27, 28 like filters or a λ/4 waveplate.

In a first exemplary embodiment, the electronic sensor 26 is a spectral or hyperspectral detector, especially, a spectral or hyperspectral image sensor. That embodiment of the image conversion module 09 provides images with an enhanced depth of field including spectral/hyperspectral images as an additional mode. The additional spectral data can be averaged over a volume of the sample 02 or over a part of a volume of the sample 02. Alternatively, the additional spectral data can be provided for a specific location in a volume of the sample 02. That first exemplary embodiment is useful for material identification, for image quality improvement, for quality improvement of 3D images and images with an enhanced depth of field, for improvement of 3D resolution and speed, for classification, for quantification, and/or as input for machine learning. The additional second optoelectronic submodule 24 can comprise a further sensor (not shown) like a spectrometer or a thermal or IR detector/camera for an extension of the spectral range.

In a second exemplary embodiment, the electronic sensor 26 is a polarization-sensitive detector, i. e., a polarization-sensitive image sensor. Using that polarization-sensitive detector 26, images of the sample 02 can be obtained simultaneously with different polarization values, e. g., four images with an angle between a polarizing element and an sensitive element of the detector of 0°, 45°, 90°, and 135°.

The polarization-sensitive detector 26 allows an additional mode that provides additional polarization data that can be either averaged over a volume of the sample 02 or over a part of a volume of the sample 02. Alternatively, the additional polarization data can be provided for a specific location in a volume of the sample 02. That second exemplary embodiment is useful for material identification, for image quality improvement, for quality improvement of 3D images and images with an enhanced depth of field, for improvement of 3D resolution and speed, for classification, for quantification, and/or as input for machine learning.

In a third exemplary embodiment, the electronic sensor 26 is configured for a simultaneous or sequential acquisition in a volume of the sample 02, wherein that volume is extended in comparison to a volume imaged by the image sensor 22. Alternatively, the electronic sensor 26 is configured for a simultaneous or sequential acquisition of a part of the volume of the sample 02. That specialized electronic sensor 26 like a specialized image sensor allows an additional mode that provides insight into a bigger volume of the sample 02 with a reduced axial resolution and possibly same axial resolution, or an improved axial or/and lateral resolution in a smaller volume of the sample 02. That third exemplary embodiment is useful for fast sample digitalization, for fast navigation over a large volume of the sample 02, for microscopic documentation with improved resolution, for manipulations in 3D, for quality improvement of 3D images and images with an enhanced depth of field, and/or for autofocus. The additional second optoelectronic submodule 24 can comprise a laser ranger as a further option.

The invention claimed is:
1. An image conversion module, comprising:
an optical interface for establishing an optical path of the image conversion module;
a beam splitting element on the optical path, wherein the beam splitting element is configured for splitting a beam entering the optical interface on the optical path into a first optical subpath and a second optical subpath;

a first exchangeable optoelectronic submodule with an image sensor;

a microelectromechanical optical system that is configured for enhancing a depth of field on the first optical subpath that is directed to the first exchangeable optoelectronic submodule; and a second exchangeable optoelectronic submodule that comprises an electronic sensor on the second optical subpath, wherein the second exchangeable optoelectronic submodule is configured for acquiring additional data on the sample, wherein the electronic sensor of the second exchangeable optoelectronic submodule is an additional image sensor, or the electronic sensor of the second exchangeable optoelectronic submodule is configured for measuring geometric properties of the sample, or the electronic sensor of the second exchangeable optoelectronic submodule is configured for detecting a feature of the sample, wherein the additional image sensor of the second exchangeable optoelectronic submodule is a polarization image sensor, a hyperspectral image sensor, or a thermal image sensor.

2. Image conversion module according to claim 1, wherein the microelectromechanical optical system comprises an array of moveable micromirrors (18), wherein each of the movable micromirrors shows two degrees of freedom of rotation and one degree of freedom of translation.

3. Image conversion module according to claim 1, wherein the beam splitting element is a beam splitter, a colour beam splitter or a polarizing beam splitter, wherein the beam splitter, the colour beam splitter or the polarizing beam splitter is directed to the first exchangeable optoelectronic submodule.

4. Image conversion module according to claim 1, wherein the beam splitting element is located between the microelectromechanical optical system and the optical interface, wherein the beam splitting element is located between the first exchangeable optoelectronic submodule and the second exchangeable optoelectronic submodule.

5. Image conversion module according to claim 1, further comprising a mechanical interface for removably mounting the image conversion module such that the image conversion module is modular.

6. Method for examining a sample using an optical instrument with an image conversion module according to claim 1, wherein the method comprises the following steps:

imaging the sample using the optical instrument, the first exchangeable optoelectronic submodule, and the microelectromechanical optical system, wherein the resulting image shows an enhanced depth of field;

recording additional data on the sample using the second exchangeable optoelectronic submodule; and displaying the image with the enhanced depth of field and the additional data.

7. Method according to claim 6, wherein the additional data are an additional image of the sample, contrast data on the sample, spectral data on the sample, polarization data on the sample, data on a geometric property of the sample, and/or data on a feature of the sample.

8. Method according to claim 7, wherein the additional image of the sample shows a differing resolution in at least one of three dimensions than the image with the enhanced depth of field and/or that the additional image represents another part of the sample than the image with the enhanced depth of field.

9. Method according to claim 7, wherein the contrast data are polarization data, differential interference data, phase contrast data, thermal imaging data, spectral imaging data, and/or hyperspectral imaging data.

* * * * *